(12) United States Patent
Murdock et al.

(10) Patent No.: US 8,073,803 B2
(45) Date of Patent: Dec. 6, 2011

(54) METHOD FOR MATCHING ELECTRONIC ADVERTISEMENTS TO SURROUNDING CONTEXT BASED ON THEIR ADVERTISEMENT CONTENT

(75) Inventors: Vanessa Murdock, Barcelona (ES);
Vassilis Plachouras, Barcelona (ES);
Massimiliano Ciaramita, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 942 days.

(21) Appl. No.: 11/778,540

(22) Filed: Jul. 16, 2007

(65) Prior Publication Data
US 2009/0024554 A1    Jan. 22, 2009

(51) Int. Cl.
*G06F 17/00* (2006.01)
*G06N 5/02* (2006.01)
(52) U.S. Cl. ............... 706/48; 706/45; 706/62
(58) Field of Classification Search .............. None
See application file for complete search history.

(56) References Cited

U.S. PATENT DOCUMENTS

| | | | | |
|---|---|---|---|---|
| 7,577,652 | B1 * | 8/2009 | Rajan et al. ................ | 1/1 |
| 2005/0137939 | A1 * | 6/2005 | Calabria et al. ............. | 705/26 |
| 2005/0144064 | A1 * | 6/2005 | Calabria et al. ............. | 705/14 |
| 2005/0144065 | A1 * | 6/2005 | Calabria et al. ............. | 705/14 |
| 2007/0061197 | A1 * | 3/2007 | Ramer et al. ............... | 705/14 |
| 2007/0061331 | A1 * | 3/2007 | Ramer et al. ............... | 707/10 |

OTHER PUBLICATIONS

Ribeiro-Neto et al., B., "Impedance Coupling in Content-targeted Advertising", SIGIR '05, Aug. 15-19, 2005.*
Kazienko, P., "Multi-agent System for Web Advertising", KES 2005, pp. 507-513, 2005.*
Jiang et al., J., "Semantic Similarity Based on Corpus Statistics and Lexical Taxonomy", Proceedings of International Conference Research on Computational Linguisstics, pp. 1-15, 1997.*
Turney, P., "Mearsuring Semantic Similarity by Latent Relational Analyis", pp. 1-6, 2005.*
Read, J, "Recognising Affect in Text using Pointwise-Mutual Information", pp. 1-41, University of Sussex, Sep. 2004.*

* cited by examiner

*Primary Examiner* — Jeffrey A Gaffin
*Assistant Examiner* — Adrian Kennedy
(74) *Attorney, Agent, or Firm* — Stattler-Suh PC

(57) ABSTRACT

A system for selecting electronic advertisements from an advertisement pool to match the surrounding content is disclosed. To select advertisements, the system takes an approach to content match that focuses on capturing subtler linguistic associations between the surrounding content and the content of the advertisement. The system of the present invention implements this goal by means of simple and efficient semantic association measures dealing with lexical collocations such as conventional multi-word expressions like "big brother" or "strong tea". The semantic association measures are used as features for training a machine learning model. In one embodiment, a ranking SVM (Support Vector Machines) trained to identify advertisements relevant to a particular context. The trained machine learning model can then be used to rank advertisements for a particular context by supplying the machine learning model with the semantic association measures for the advertisements and the surrounding context.

18 Claims, 2 Drawing Sheets

the advertisers only pay when a web viewer clicks on an advertisement.

METHOD FOR MATCHING ELECTRONIC ADVERTISEMENTS TO SURROUNDING CONTEXT BASED ON THEIR ADVERTISEMENT CONTENT

FIELD OF THE INVENTION

The present invention relates to the field of electronic advertising. In particular the present invention discloses techniques for analyzing, selecting, and displaying electronic advertisements to match the surrounding context of the electronic advertisement.

BACKGROUND OF THE INVENTION

The global Internet has become a mass media on par with radio and television. And just like radio and television content, the content on the Internet is largely supported by advertising dollars. The main advertising supported portion of the Internet is the "World Wide Web" that displays HyperText Mark-Up Language (HTML) documents distributed using the HyperText Transport Protocol (HTTP).

Two of the most common types of advertisements on the World Wide Web portion of the Internet are banner advertisements and text link advertisements. Banner advertisements are generally images or animations that are displayed within an Internet web page. Text link advertisements are generally short segments of text that are linked to the advertiser's web site.

With any advertising-supported business model, there needs to be some metrics for assigning monetary value to the advertising. Radio stations and television stations use ratings services that assess how many people are listening to a particular radio program or watching a particular television program in order to assign a monetary value to advertising on that particular program. Radio and television programs with more listeners or watchers are assigned larger monetary values for advertising. With Internet banner type advertisements, a similar metric may be used. For example, the metric may be the number of times that a particular Internet banner advertisement is displayed to people browsing various web sites. Each display of an internet advertisement to a web viewer is known as an "impression."

In contrast to traditional mass media, the internet allows for interactivity between the media publisher and the media consumer. Thus, when an internet advertisement is displayed to a web viewer, the internet advertisement may include a link that points to another web site where the web viewer may obtain additional information about the advertised product or service. Thus, a web viewer may 'click' on an internet advertisement and be directed to that web site containing the additional information on the advertised product or service. When a web viewer selects an advertisement, this is known as a 'click through' since the web viewer 'clicks through' the advertisement to see the advertiser's web site.

A click-through clearly has value to the advertiser since an interested web viewer has indicated a desire to see the advertiser's web site. Thus, an entity wishing to advertise on the internet may wish to pay for such click-through events instead of paying for displayed internet advertisements. Many Internet advertising services have therefore been offering internet advertising wherein advertisers only pay for web viewers that click on the web based advertisements. This type of advertising model is often referred to as the "pay-per-click" advertising model since the advertisers only pay when a web viewer clicks on an advertisement.

With such pay-per-click advertising models, internet advertising services must display advertisements that are most likely to capture the interest of the web viewer to maximize the advertising fees that may be charged. In order to achieve this goal, it would be desirable to be able to selecting advertisements that most closely match the context that the advertising is being displayed within. In other words, the selected advertisement should be relevant to the surrounding content. Thus, advertisements are often placed in contests that match the product at a topical level. For example, an advertisement for running shoes may be placed on a sport news page. Simple information retrieval systems have been designed to capture such "relevance." Examples of such information retrieval systems can be found in the book "Modern Information Retrieval" by Baeza-Yates, R. and Ribeiro-Neto, B. A., ACM Press/Addison-Wesley, 1999.

However, advertisements are not placed on the basis of topical relevance alone. For example, an advertisement for running shoes might be appropriate and effective on a web page comparing MP3 players since running shoes and MP3 players share a target audience, namely recreational runners. Thus, although MP3 players and running shoes are very different topics (and may share no common vocabulary) MP3 players and running shoes are very closely linked on an advertising basis. Conversely, there may be advertisements that are very topically similar to a potential Web page but cannot be placed in that web page because they are inappropriate. For example, it would be inappropriate to put an advertisement for a particular product in the web page of that product's direct competitor.

Furthermore, the language of advertising is rich and complex. For example, the phrase "I can't believe it's not butter!" implies at once that butter is the gold standard, and that this product is indistinguishable from butter. Understanding advertisement involves inference processes which can be quite sophisticated and well beyond what traditional information retrieval systems are designed to cope with. Due to these difficulties, it would be desirable to have systems that extend beyond simple concepts of relevance handled by existing information retrieval systems.

SUMMARY OF THE INVENTION

The present invention introduces methods for selecting electronic advertisements from a pool to match the surrounding content, a problem generally referred to as "content match." Advertisements provide a limited amount of text: typically a few keywords, a title and brief description. The advertisement-selection system needs to identify relevant advertisements quickly and efficiently on the basis of this very limited amount of information. To select advertisements, the system of the present invention takes an approach to content match that focuses on capturing subtler linguistic associations between the surrounding content and the content of the advertisement.

The system of the present invention implements this goal by means of simple and efficient semantic association measures dealing with lexical collocations such as conventional multi-word expressions like "big brother" or "strong tea". The semantic association measures are used as features for training a machine learning model. In one embodiment, a ranking SVM (Support Vector Machines) trained to identify advertisements relevant to a particular context. The trained machine learning model can then be used to rank advertisements for a particular context by supplying the machine learning model with the semantic association measures for the advertisements and the surrounding context.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION

Methods for analyzing, selecting, and displaying electronic advertisements are disclosed. In the following description, for purposes of explanation, specific nomenclature is set forth to provide a thorough understanding of the present invention. However, it will be apparent to one skilled in the art that these specific details are not required in order to practice the present invention. For example, although the present invention is mainly disclosed whit reference to advertisements placed in the World Wide Web aspect of the internet, the same techniques can easily be applied in other situations. Specifically, the techniques of the present invention can be used in any application that requires ranking the relevance of some groups of text to a surrounding text. Thus, the present invention could be used in other applications that require matching advertising text to other surrounding content.

Advertising Support for Commercial World Wide Web Sites

The World Wide Web portion of the global Internet has become a mass media that largely operates using advertiser sponsored web sites. Specifically, web site publishers provide interesting content that attracts web site viewers and the publisher intersperses paid advertisements into the web pages of the web site. The fees from the advertisers compensate the web site publisher for creating the interesting content that attracts the web viewers.

Some internet web site advertisements are 'banner advertisements' consisting of an advertiser-supplied image or animation. Other internet web site advertisements merely consist of simple short strings of text. However, one thing that most internet web site advertisements have in common is that the internet web site advertisements contain a hyperlink (link) to another web site such that the person viewing the internet advertisement may click on the advertisement to be directed to the advertiser's web site to obtain more information.

Figure 1:
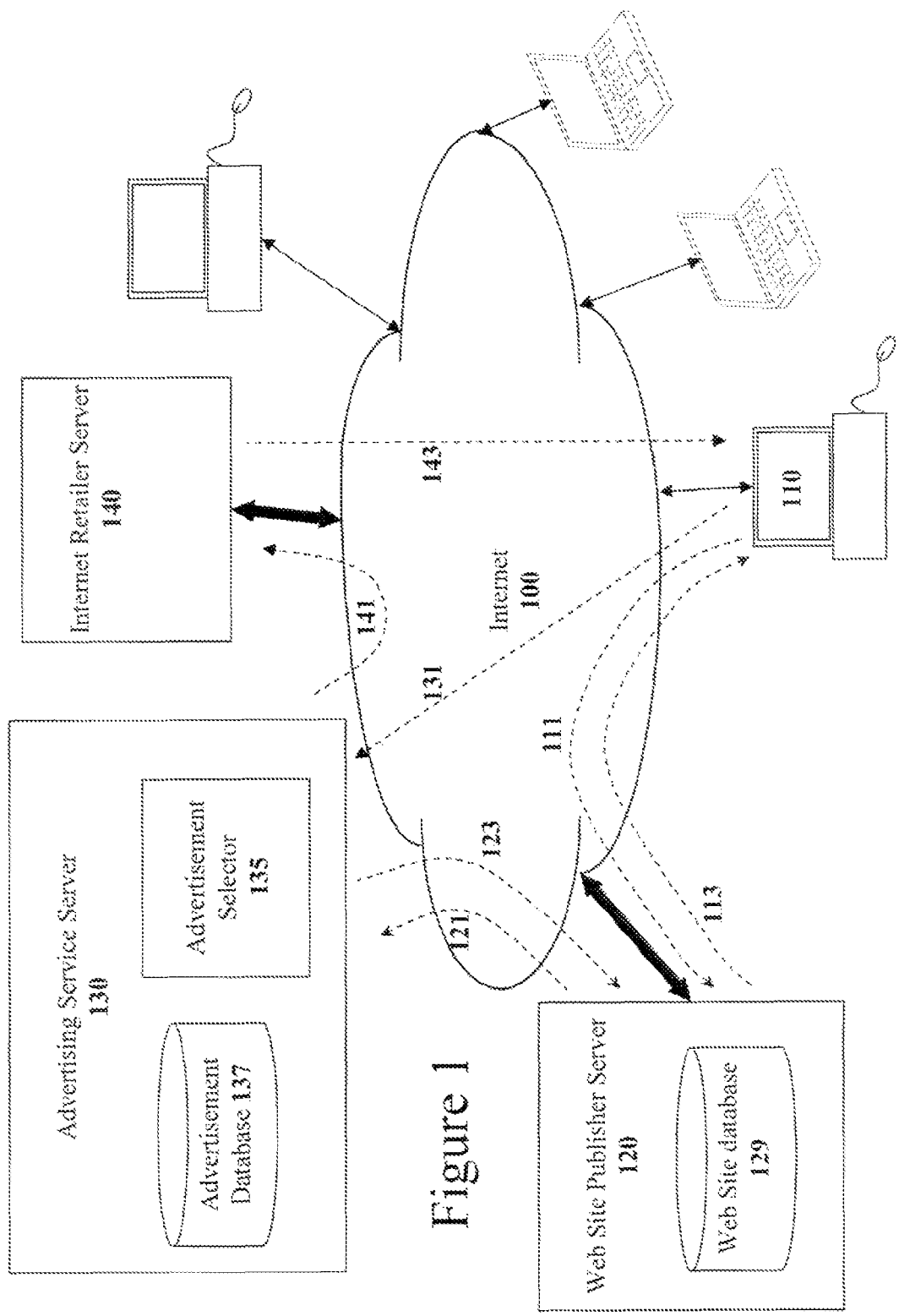
FIG. 1 illustrates a conceptual diagram of a user at a personal computer system accessing a web site server on the internet that is supported by an advertising service.

The advertisements within an advertisement supported web site are generally provided to a web site publisher by an external internet advertising service. FIG. 1 illustrates conceptual diagram of how an internet advertising service and a web site publisher operate. Referring to FIG. 1, an internet-based retailer server 140 that sells products to internet-based customers may sign up with an internet advertisement service 130 in order to promote the web site of the internet based retailer. When an internet user at personal computer 110 is browsing a web site published by web site publisher server 120, the internet user may be exposed to an advertisement from internet advertisement service 130 that advertises the offerings of the internet retailer 140.

If the internet user at personal computer 110 is sufficiently interested in the advertisement, the internet user may click on the advertisement such that the user will be re-directed to the internet retailer server 140. That internet user will be re-directed to the internet retailer server 140 through an advertising service server 130 that will record the user's selection of the advertisement in order to bill the advertiser for the selection of the advertisement. Once the internet user has been re-directed to the internet retailer server 140, the user at personal computer 110 may purchase goods or services directly from the internet retailer server 140.

Referring to the Internet advertising example of FIG. 1, the internet retailer 140 obtains the most benefit from internet-based advertisements when an internet user clicks on the internet advertisement and visits the Internet Retailer web site 140. Thus, the internet retailer would ideally only like to pay for advertisements when web viewers click on the advertisements. In response, many internet advertising services have begun to offer advertising services on such a "pay-per-click" basis.

In order to maximize the advertising revenue, the advertising service 130 needs to select internet advertisements from an advertisement database 137 that will most appeal to the web viewers. This will increase the probability of a user clicking on an advertisement thus resulting in income for the internet advertising service 130. One method of selecting an internet advertisement may be to examine the contents of the web page that the internet user at personal computer 110 selected and attempt to select an advertisement that closely complements that web page selected by the user. This technique of selecting an advertisement to matching the surrounding content is often referred to as "content match."

The Advertisement Selection Problem

Content match involves selecting and placing a relevant advertisement onto a web page that will be referred to as the "target page." The typical elements of a web advertisement are a set of keywords, a title, a textual description, and a hyperlink pointing to a web page associated with the advertisement. The web page associated with the advertisement is referred to as the "landing page" since mat is the location wherein a user will land if the user clicks on the advertisement. In addition, an advertisement typically has an advertiser identifier and can be part of an organized advertising campaign. For example, the ad may be a subset of all the advertisements associated with same advertiser identifier. This latter information can be used, for example, to impose constraints on the number of ads to display relative to a campaign or advertiser. While this may be the most common layout, advertisement structure can vary significantly and include multimedia information such as images, animations, and video.

Overall Problem to Address

In general, the content match problem for an advertisement placing system can be formalized as a ranking task. Let A be a set of advertisements and P be the set of possible target pages. A target page-advertisement pair $(p,a)$, $p \in P$, $a \in A$, (an observation) can be represented as a vector of real-valued features $x=\Phi(p,a)$. The real-valued features are derived from the advertisement, the target page, or a combination of the advertisement and the target page. $\Phi$ is a feature map in a d-dimensional feature space $X \subset R^d$; i.e., $\Phi: A \times P \to X$. Useful features for ranking page-advertisement pairs include text similarity measures such as the well known vector cosine between the advertisement and the target page, possibly weighting each word's contribution with traditional term frequency-inverse document frequency (tf-idf) schemes.

The main objective of content match is to find a ranking function $f: \Phi(p,a) \rightarrow R$ that assigns scores to pairs (p,a) such that advertisements relevant to the target page are assigned a higher score than less relevant advertisements. If one takes as $\Phi$ a function which extracts a single feature (such as the cosine similarity between the advertisement and the target page) then f is a traditional information retrieval ranking function. However, the present invention instead concerns ranking functions $f_\alpha$ that are parameterized by a real-valued vector $\alpha \in R^d$, which weights the contribution of each feature individually. In particular, the present invention addresses machine learning approaches to advertisements ranking in which the weight vector a α is learned from a set of evaluated rankings.

Optimization Approach

In the most general formulation of the advertisement ranking task, the advertisement-placing system is given a target page p and then uses the ranking function to score all of the possible target page-advertisement pairs $(p,a_j)$, $\forall a_j \in A$. Advertisements are then ranked by the score $f_\alpha(p,a_j)$. Since the pool of advertisements can be very large, it may be difficult to perform all the needed calculations in real-time. Thus, in one embodiment, a screening system may be used to perform an initial quick assessment to select the best N advertisements from the entire advertisement pool for the target page. N may vary for different target pages. $\forall$ Accordingly, the original problem is then reformulated as a re-ranking or optimization problem. In such a system, the goal is to rank the relevance of possible advertisements for a target page from the subset of N advertisements (the advertisements selected by the screening system from advertisement pool A). The re-ranking or optimization from a subset problem can be formally stated as, given target page p, ranking all pairs $(p,a_j)$, $\forall a_j \in A_p \subset A$, where $A_p$ is the subset of A selected for target page p by the initial screening system.

Overview of the Proposed System

Earlier efforts in content match have largely focused on traditional information retrieval notions of relevance. For example, art information retrieval system may determine the relevance of an advertisement with respect to a target page based on cosine similarity with term frequency-inverse document frequency (tf-idf). However, the limited context provided by the advertisements, and the huge variance in type and composition of target pages may pose a considerable vocabulary mismatch.

The system of the present invention capitalizes on the fact that there may be many pairs of distinct words appearing in the advertisement and the target page that might be strongly related and provide useful features for ranking advertisements. As an example, the presence of pairs of words such as "exercise-diet", "USB-memory", or "lyrics-ed" might be useful in discriminating advertisements which might otherwise have the same overlapping keywords and in general might appear similar based on simpler features. Thus, proper modeling correlation at the lexical level could capture such semantic associations.

The present invention introduces an advertisement-placing system that exploits such lexical semantic associations by means of simple and efficient features. In the system of the present invention, a feature map extracts several properties of a target page-advertisement pair. The feature map includes simple statistics about the degree of distributional correlation existing between words in the advertisement and words in the target page in addition to more standard information retrieval features. This new class of features may be referred to as "semantic association features" because they capture distributional co-occurrence patterns between lexical items. These semantic association features are used for training a machine learning model such as a ranking SVM (Support Vector Machines). The trained machine learning model can then be used to rank advertisements for a particular context by supplying the machine learning model with the semantic association measures for the advertisements and that context.

Let (p,a) be a target page-advertisement pair and $w_p \in p$, $w_a \in$ be two words occurring in the target page or advertisement. To estimate the semantic association between the words $w_p$ and $w_a$ the system uses several methods: point-wise mutual information (PMI), Pearson's $\chi^2$ statistic (Manning & Schüetze, 1999), and clustering. PMI and Pearson's $\chi^2$ are popular estimates of the degree of correlation between distributions. All these measures are based on the joint and individual relative frequencies of the words considered; e.g., $P(w_p)$, $P(w_a)$ and $P(w_p, w_a)$. The system computed word frequencies from different sources, namely, search engine indexes and query logs. As an example of the types of word associations picked up by such measures, Table 1 lists the ten most strongly correlated words using Pearson's $\chi^2$ statistic for the dataset described in the paper "A Reference Collection for Web Spam" by Castillo, C., D. Donate, L. Becchetti P. Boldi, S. Leonardo, M. Santini and S. Vigna, "A Reference Collection for Web Spam", ACM SIGIR Forum 40(2): 11-24, 2006.

TABLE 1

| | $w_p$ | | | |
|---|---|---|---|---|
| $\chi^2$-ranked $w_a$ | basketball | hotel | cellphone | bank |
| 1 | baseball | accommodation | ringtone | mortgage |
| 2 | hockey | airport | logos | secured |
| 3 | football | rooms | motorola | loan |
| 4 | nascar | inn | nokia | credit |
| 5 | nba | travel | cellular | equity |
| 6 | rugby | restaurant | cell | rate |
| 7 | nhl | destinations | samsung | refinance |
| 8 | sports | attractions | tone | accounts |
| 9 | mlb | reservation | ring | cash |
| 10 | lakers | flights | verizon | financial |

When combined with other traditional content match features, these semantic association measures are very useful for identifying good content matches based on the content of the target page and the advertisement. A relatively a small set of these semantic association measures can be computed efficiently. Table 2 lists various content match features used in various embodiments of the present invention. In Table 2, p stands for the target page, a stands for the advertisement, and T, D, K, L stand for the Title, Description, Keywords and Landing page of the advertisement. The individual content match features are described in detail in later sections of this document.

TABLE 2

| $\Phi_i$ | Range | Description |
|---|---|---|
| x∈{a, $a_T$, $a_D$, $a_K$, $a_L$,} | Real | sim(p, x) where sim is cosine similarity |
| K | Binary | $|[\forall w \in a_K \, w \in p]|$ and $|[\exists w \in a_K \, w \notin p]|$, where $|[\cdot]|$ denotes the indicator function |
| NIST | Real | Functional of overlapping n-grams between $p_T$ and $a_T$ |
| PMI | Real | max PMI($w_p$, $w_a$) and avg PMI($w_p$, $w_a$) where PMI is the point-wise mutual information between $w_p$ and $w_a$ |
| CSQ | Real | # pairs ($w_p$, $w_a$) in top x % ranked pairs according to $\chi^2$ |
| Clustering | Categorical | Cluster identifier of the advertisement, page, and both advertisement and page |

Operation of the Proposed System

FIG. 4 illustrates a high-level flow diagram describing the operation of the of the advertisement selection system of the present invention. Initially at step 210, the system may use a screening system to select a subset of advertisements to be rank. The screening system would reduce the computational load by reducing the number of candidate advertisements that need to be considered. However, note that step 210 is an optional step and the system could rank every advertisement in the advertisement pool.

Extracting Elements from Target Pages and Advertisements

Next, at step 220, the system extracts keywords and other elements required to calculate the various content match features that will be considered. The semantic association features are based on correlations between pairs of words. To limit the number of comparisons, one embodiment selects a subset of terms from the target page and a subset of terms from the advertisement. For example, in one embodiment the keywords and the title are used from the advertisement.

For the target page, a subset of keywords is extracted from the target web page. Ideally the extracted subset of keywords from a target page corresponds to the most informative keywords of the target page. In one embodiment, the system obtains the fifty most informative keywords using the terra weighting model BoI from the Divergence From Randomness (DFR) framework proposed by G. Amati in the paper "Probabilistic Models for Information Retrieval based on Divergence from Randomness", PhD thesis, Department of Computing Science, University of Glasgow, 2003. The model BoI, which has been used effectively for automatic query expansion, assigns a high score to terms whose distribution is different in the target document p and in the set of all target pages. The weight w(t) of a term t is computed as follows:

$$w(t) = tf_x \log_2 \frac{1 + P_n}{P_n} + \log_2(1 + P_n)$$

where $tf_x$ is the frequency of a term in the target document p, and $P_n = F/|P|$ is the probability that the term t occurs in the set of target documents. F is the frequency of t in the set of |P| target documents.

Figure 2:
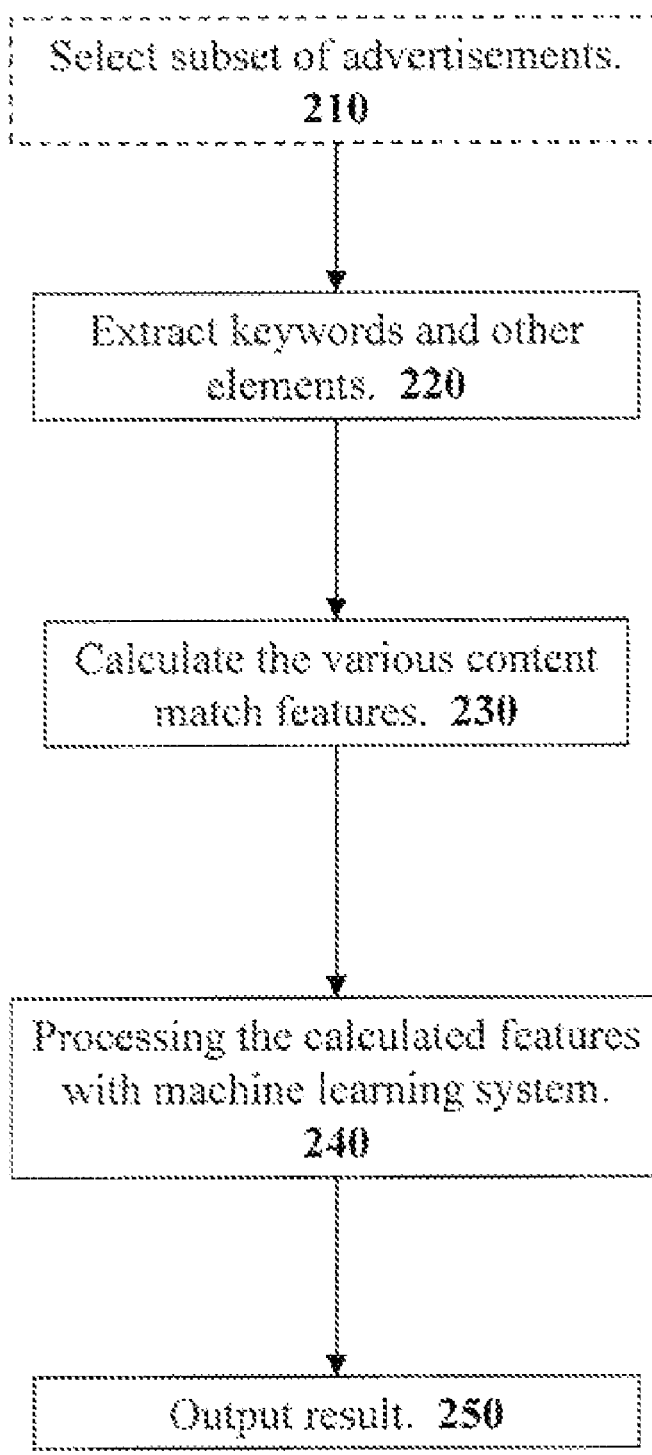
FIG. 2 illustrates a high-level flow diagram describing the operation of an advertisement analysis system that uses semantic association features with a machine learning system.

Referring back to FIG. 2, after extracting the various elements from the target page and the advertisements, system of the present invention then calculates the various content match features for each advertisement to be considered at step 230. The content match features will be used to evaluate how well an advertisement matches the target page. The system of the present invention may be implemented with various different embodiments that use some content match features hut not other content match features. Furthermore, the following list of content match features represents just a subset of the possible content match features that may be used.

Text Similarity Feature

The first type of feature is the text similarity between a target page and the advertisement. The text similarity feature may be performed on the entire advertisement (a) or it may determined on individual parts of the advertisement such as the advertisement title ($a_T$), the advertisement keywords ($a_K$), or the advertisement description ($a_D$). The text similarity feature may also be obtained by comparing the target page and the landing page associated with the advertisement ($a_L$).

Before performing the cosine similarity test, the advertisements were stemmed using the Krovetz stemmer disclosed in the paper "Viewing morphology as an inference process," by Krovetz, R., in R. Korfhage et al., Proc. 16th ACM SIGIR Conference, Pittsburgh, Jun. 27-Jul. 1, 1993: pp. 191-202. Stop words were also removed. The stop words were from a list of 733 words supplied with the system described in the paper "Terrier: A High Performance and Scalable information Retrieval Platform", by Ounis, L., Amati, G., Plachouras, V., He, B., Macdonald, C. and Lioma, C., in Proceedings of ACM SIGIR'06 Workshop on Open Source information Retrieval (OSIR 2006). Note that these adjustments may be performed in step 220.

After the stemming process, a target page and advertisement pair (p,a) are processed with cosine-similarity measure. In one embodiment, the cosine similarity system employed tf-idf term weights, as follows:

$$sim(p, a) = \frac{\sum_{t \in p \cap a} w_{pt} \cdot w_{at}}{\sqrt{\sum_{t \in p} (w_{pt})^2} \cdot \sqrt{\sum_{t \in a} (w_{at})^2}}$$

In the above equation, the weight $w_{pt}$ of term t in the target page p corresponds to its tf-idf score;

$$w_{pt} = tf \cdot \log\left(\frac{|P| + 1}{n_t + 0.5}\right)$$

where $n_t$ is the target page frequency of term t, and |P| is the number of target pages.

Exact Match Feature—Keyword Overlap

Another type of feature shown to be effective in the content match of a target page and an advertisement is the overlap of keywords between the target page and the advertisement. In one embodiment, the keyword overlap system presented by Ribeiro-Neto, B., Cristo, M., Golgher, P. B. and E. S. De Moura, in the paper titled "Impedance coupling in content-targeted advertising" (Proceedings of the 28th annual international ACM SIGIR conference on Research and development in information retrieval, ACM Press, pp. 496-503, 2005) was used to determine a keyword overlap feature.

The Ribeiro-Neto system excludes the retrieved pairs of target page and advertisements in which the target page did not contain all the advertisement keywords. To capture that constraint, we consider two complementary binary features. For a given pair, the first feature is 1 if all the keywords of the ad appear in the target page, otherwise it is 0. The second feature is the complement of the first feature, (it is 0 when all the keywords of the advertisement appear in the target page, and otherwise it is 1). We denote this pair of features by "K" in the result tables.

Exact Match Feature—N-Gram Overlap

Another content match metric for measuring overlap between an advertisement and a target page is to identify n-grams (n word phrases) that the advertisement and the target page have in common. To provide a score that summarizes the level of overlap in n-grams between the advertisement and the target page one may compute a "BLEU" score. BLEU is a metric commonly used to evaluate machine translations. In one embodiment, a variant of BLEU score known as the NIST score was used. The NIST score is fully disclosed in the paper "Automatic Evaluation of Machine Translation Quality Using N-gram Co-Occurrence Statistics" (NIST Report, 2002) and presented in the following equation:

$$NIST = \sum_{n=1}^{N} \left\{ \sum_{w_1 \ldots n^{co-occuring}} Info(w_{1-n}) \Big/ \sum_{w_1 \ldots n^{output}} (1) \right\} \cdot$$

$$\exp\left\{ \beta \log^2 \left[ \min\left(\frac{L_{sys}}{L_{ref}}, 1\right) \right] \right\}$$

where $w_{1 \ldots k}$ is an n-gram of length k, $\beta$ is a constant that regulates the penalty for short "translations", N=5, $L_{ref}$ is the average number of words in the target page title, and $L_{sys}$ is the number of words in the advertisement title. In addition, $$Info(w_{1-n}) = \log_2 \left( \frac{count(w_{1 \ldots n-1})}{count(w_{1 \ldots n})} \right)$$

where the counts of the n-grams are computed over the target page title. The idea is to give less weight to very common n-grams (such as "of the") and more weight to infrequent and potentially very informative n-grams.

Semantic Association Feature—Point-Wise Mutual Information (PMI)

The text similarity features and exact match features presented in the previous sections are based on the exact matching of keywords between a target page and art advertisement. However, the number of exact matching keywords between the target and the advertisement may be low since advertisements are generally not very large. In the system of the present invention, this potential vocabulary mismatch problem between a target page and an advertisement is overcome by considering the semantic association between terms.

In one embodiment, the system used two different statistical association estimates in order to estimate the association of pairs of terms that do not necessarily occur in both the target page and the advertisement: point-wise mutual information (PMI) and Pearson's $\chi^2$. The system estimated PMI and Pearson's $\chi^2$ with reference word counts from three different corpora; i) the World Wide Web, ii) the summary of the UK2006 collection, consisting of 2.8 million Web pages, and iii) a query log from a Web search engine. In the case of the World Wide Web and the UK2006 collection, the number of documents in which terms occur were counted. In the ease of the query log, the number of distinct queries in which terms occur were counted.

The point-wise mutual information (PMI) between two keywords $t_1$ and $t_2$ is given as follows:

$$PMI(t_1, t_2) = \log \frac{P(t_1, t_2)}{P(t_1)P(t_2)}$$

where P(t) is the probability that keyword t appears in a document of the reference corpus and $P(t_1, t_2)$ is the probability that keywords $t_1$ and $t_2$ co-occur in a document. We use PMI to compute the association between a target document and an advertisement in the following way. For a subset of keywords from p and a subset of keywords from a, we compute the PMI of all the possible pairs of keywords. Then we use both the average $PMI_{AVG}(p,a)$ and the maximum $PMI_{MAX}(p,a)$ as two features to be considered by the machine learning system. Additional details about Pointwise Mutual Information can be found in "Accurate Methods for the Statistics of Surprise and Coincidence" by Dunning, T., Computational Linguistics, 19(1), 1993 and in "Foundations of Statistical Natural Language Processing" by Christopher D. Manning and Hinrich Schuetze, MIT Press, Cambridge Mass., 1999, Chapter 2, p. 68 (Sixth printing, 2003.).

Semantic Association Feature—Pearson's $\chi^2$

In some embodiments, a semantic association feature known as Pearson's $\chi^2$ was used. To determine Pearson's $\chi^2$, the system first counts the number of documents in a reference corpus of M documents, in which a pair of terms $t_1$ and $t_2$. Next, the following 2×2 table is generated:

|  | $t_1$ | $\neg t_1$ |
|---|---|---|
| $t_2$ | $o_{11}$ | $o_{12}$ |
| $\neg t_2$ | $o_{21}$ | $o_{22}$ | where $o_{11}$ is the number of documents that contain terms $t_1$ and $t_2$, $o_{12}$ is the number of documents that contain term $t_2$ but not term $t_1$, $o_{21}$ is the number of documents that contain term $t_1$ but not term $t_2$, and $o_{22}$ is the number of documents that do not contain $t_1$ or $t_2$. The system then computes Pearson's $\chi^2$ using the following closed form equation:

$$\chi^2 = \frac{M(o_{11}o_{21} - o_{12}o_{22})^2}{(o_{11} + o_{12})(o_{11} + o_{21})(o_{12} + o_{22})(o_{21} + o_{22})}$$

The system computes the $\chi^2$ statistic for the pairs of keywords extracted from the target pages and the advertisements. Normally, the $\chi^2$ statistic is compared to the $\chi$ distribution to assess significance. However, in one embodiment such a comparison was not reliable due to the magnitude of counts. For that reason, one embodiment opted for considering a given percentage of the keyword pairs with the highest value of the $\chi^2$ statistic. The system sorted the keyword pairs in decreasing order of the $\chi^2$ statistic. Then for each pair the system used the number of keyword pairs that have a $\chi^2$ statistic in the top x % of all the pairs. Individual different features were calculated for 0.1%, 0.5%, 1%, and 5%. These features are denoted by $CSQ_x$ wherein x represents the percentage of the most strongly related keyword pairs. For example, $CSQ_1$ for a given pair of target document and advertisement is the number of keyword pairs with a $\chi^2$ statistic in the top 1% of the $\chi^2$ statistic.

Document Level Feature—Cluster

All of the content snatch features described in the earlier sections model the association between target pages and advertisements at a lexical level. Some embodiments of the present invention also include content match features that estimate the similarity between advertisements and target pages at the document level. Specifically, some embodiments were constructed to include document similarity features compiled by means of clustering. The assumption is that knowing what cluster an advertisement or web page belongs to might provide useful discriminative information.

In one embodiment, K-Means clustering was implemented with tf-idf cosine, similarity computed separately on the collection of advertisements and on the collection of content pages. Details on K-means clustering can be located in the book "Pattern classification (2nd edition)" by Duda, R. O. and P. E. Hart and D. G. Stork, Wiley Interscience, 2002. In one embodiment, the system selected three fixed sizes for the number k of clusters: 5, 10 and 15. The clustering features are categorical features consisting in the cluster id of the advertisement, the cluster id of the target page, and the pair of id for both, for all three different values of k. An advantage of using clustering features is that, similarly to the lexical semantic features, clustering features can be computed efficiently from the raw data without any additional knowledge or language specific tools.

Applying the Features to a Machine Learning System

Referring back to FIG. 2, after calculating all of the different content snatch features to be considered in step 230, the next step is to process the content match features with a trained machine learning model at step 240. The machine learning model will output rankings for each advertisement that may be used to select the most relevant advertisement.

The machine learning model may be constructed using many different technologies. For example, a perceptron-based ranking system may be implemented according to the teachings in the paper "A New Family of Online Algorithms for Category Ranking" by Crammer, K, and Y. Singer, Journal of Machine Learning Research, 3:1025-1058, 2003. Alternatively, a boosting-based system may be implemented according to the teachings in the paper "BoosTexter: A boosting-based system for text categorization" by Schapire, R. E. and Y. Singer, Machine Learning, 39(2/3):135-168, 2000.

However, a Support Vector Machine based system was constructed in a preferred embodiment. Detailed information about Support Vector Machines can be found in "The Nature of Statistical Learning Theory" by V. N. Vapnik, Springer, 1995. Specifically, one model was constructed according to the teachings set forth in paper "Optimizing search engines using click-through data" by T. Joachims, Proceedings of the 8th ACM SIGKDD international conference on knowledge discovery and data mining, pp. 133-142, 2002.

The objective function of that system is the number of discordant pairs between a ground truth ranking and the ranking provided by the Support Vector Machine. The number of discordant pairs is minimized during the training of the Support Vector machine.

The Support Vector Machine was trained to learn a ranking function $f_\alpha$, used to assign a score to target page-advertisement pairs (p,a). Specifically, the defined feature map $\Phi(p,a)$ comprising the various content match features from the previous section is processed by the Support Vector Machine. The score of a target page-advertisement pair (p,a) is a linear combination of the weights associated with each feature that defines the ranking function:

$$f_\alpha(p,a) = <a_j \Phi(p,a)>$$

where $<x,y>$ is the inner product between vectors x and y, and vector $\alpha$ is learned with Support Vector Machine ranking.

Results of the System

The machine learning based advertising-selection system that uses semantic association features has proven to be very effective at identify advertisements that matching surrounding content. In this section the results of the system are compared against information retrieval baselines as well as machine learned baseline that only use text similarity matching.

Table 3 summarizes the results of an information retrieval baseline based on cosine similarity only. The table reports Kendall's $\tau_b$, and precision at 5, 3 and 1 for cosine similarity on different portions of the advertisement wherein a is the entire advertisement. $a_T$ is the advertisement title, $a_D$ is the advertisement description, $a_k$ is the advertisement keywords, and $a_L$ is the landing page associated with the advertisement. Kendall's $\tau_b$, is folly described in the paper "A Modification of Kendall's Tau for the Case of Arbitrary Ties in Both Rankings" by M. L. Adler, Journal of the American Statistical Association, Vol. 52, No. 277, pp. 33-35, 1957. When considering the different fields of the advertisements, it has been determined that the title is the most effective field for computing the similarity with respect to all evaluation measures.

TABLE 3

| Cosine similarity | Kendall's $\tau_b$ | P@5 | P@3 | P@1 |
|---|---|---|---|---|
| p-a | 0.233 | 0.623 | 0.663 | 0.685 |
| p-$a_T$ | 0.251 | 0.632 | 0.664 | 0.690 |
| p-$a_D$ | 0.216 | 0.610 | 0.642 | 0.659 |
| p-$a_K$ | 0.206 | 0.616 | 0.646 | 0.681 |
| p-$a_L$ | 0.157 | 0.604 | 0.646 | 0.680 |

Next, various systems constructed using the Support Vector Machine (SVM) based machine learning were evaluated and the results are presented in Table 4. In this setting the cosine similarity between the target page and the advertisement or a particular advertisement field is used as a content match feature and weighted individually by SVM. In addition, various combinations of advertisement features are examined. As would be expected, the cosine similarity between the target page and a single advertisement portion as handled with SVM performs pretty much the same as the corresponding information retrieval test Table 3. The SVM-weighted combination of features improves Kendall's $\tau_b$ but the changes in precision between p-a or p-$a_T$ and p-$a_{TDK}$, respectively, are not significant. In Table 4, the combination of p-$a_{TDKL}$ was selected as a baseline for comparing later implementations that incorporated the semantic association features. The combination of p-$a_{TDKL}$ is the best performing combination of features with respect to Kendall's $\tau_b$, P@5 and P@3 in Table 4.

TABLE 4

| Features | Kendall's $\tau_b$ | P@5 | P@3 | P@1 |
|---|---|---|---|---|
| p-a | 0.243 | 0.625 | 0.663 | 0.684 |
| p-a$_T$ | 0.266 | 0.632 | 0.665 | 0.688 |
| p-a$_D$ | 0.221 | 0.611 | 0.641 | 0.657 |
| p-a$_K$ | 0.217 | 0.617 | 0.648 | 0.681 |
| p-a$_L$ | 0.157 | 0.603 | 0.640 | 0.665 |
| p-a$_{TDK}$ | 0.276 | 0.635 | 0.668 | 0.686 |
| p-a$_{TDKL}$ | 0.279 | 0.637 | 0.676 | 0.687 |
| p-aa$_L$ | 0.255 | 0.630 | 0.663 | 0.685 |
| p-aa$_{TDK}$ | 0.275 | 0.634 | 0.668 | 0.685 |
| p-aa$_{TDKL}$ | 0.275 | 0.636 | 0.671 | 0.687 |

Next, the exact match features were added to the combinations cosine similarity features. Table 5 illustrates the results from three different combinations of cosine similarity features and the same three combinations of cosine similarity features with the keyword overlap content match feature exact match added.

TABLE 5

| Features | Kendall's $\tau_b$ | P@5 | P@3 | P@1 |
|---|---|---|---|---|
| p-aa$_L$ | 0.255 | 0.630 | 0.663 | 0.685 |
| p-a$_{TDKL}$ (baseline) | 0.279 | 0.637 | 0.676 | 0.687 |
| p-aa$_{TDKL}$ | 0.275 | 0.636 | 0.671 | 0.687 |
| p-aa$_L$K | 0.261 | 0.635 | 0.673 | 0.707 |
| p-a$_{TDKL}$K | 0.269 | 0.638 | 0.673 | 0.696 |
| p-aa$_{TDKL}$K | 0.286 | 0.643 | 0.681 | 0.716 |

The n-gram exact match feature was then added, as reflected by NIST score between the titles of the advertisement and the target page. Table 6 compares the baseline from Table 4 and the same system with the NIST score included. The improvement in precision at rank one is statistically significant, and this model is carried forward in the following results because it is the best performing so far.

TABLE 6

| Features | Kendall's $\tau_b$ | P@5 | P@3 | P@1 |
|---|---|---|---|---|
| p-a$_{TDKL}$ (baseline) | 0.279 | 0.637 | 0.676 | 0.687 |
| p-aa$_{TDKL}$K-NIST | 0.278 | 0.638 | 0.681 | 0.732 |

Next, various combinations of the semantic association features. Point-wise Mutual Information (PMI) and Pearson's $\chi^2$, were added to the SVM-based system. Table 7 summarizes the results of the previous baseline models and the models that include the semantic association features. Rows labeled with PMI show point-wise mutual information features and rows labeled with CSQ$_x$ indicate the Pearson's $\chi^2$ features with corresponding threshold on the percentage of significant terms. As these features use frequencies from external corpora we indicate with subscript "Web" the search, engine index, with subscript "UK" the UK2006 summary collection, and with subscript "QLog" the query logs.

TABLE 7

| Features | Kendall's $\tau_b$ | P@5 | P@3 | P@1 |
|---|---|---|---|---|
| p-a$_{TDKL}$ (baseline) | 0.279 | 0.637 | 0.676 | 0.687 |
| p-aa$_{TDKL}$K-NIST | 0.278 | 0.638 | 0.681 | 0.732 |
| p-aa$_{TDKL}$K-NIST-PMI$_{Web}$ | 0.321 | 0.654 | 0.698 | 0.745† |
| p-aa$_{TDKL}$K-NIST-PMI$_{UK}$ | 0.322 | 0.655 | 0.696 | 0.741† |
| p-aa$_{TDKL}$K-NIST-PMI$_{QLog}$ | 0.290 | 0.641 | 0.684 | 0.716 |
| p-aa$_{TDKL}$K-NIST-CSQ$_{0.1,Web}$ | 0.290 | 0.644 | 0.688 | 0.733* |

TABLE 7-continued

| Features | Kendall's $\tau_b$ | P@5 | P@3 | P@1 |
|---|---|---|---|---|
| p-aa$_{TDKL}$K-NIST-CSQ$_{0.1,UK}$ | 0.295 | 0.643 | 0.688 | 0.735* |
| p-aa$_{TDKL}$K-NIST-CSQ$_{1,QLog}$ | 0.313 | 0.652 | 0.697 | 0.753† |

As illustrated by Table 7, the inclusion of these semantic association features improves performance compared to the baseline results presented in the first two rows. The best performing combination of features is the Pearson's $\chi^2$ statistic where the feature is estimated from a search engine query log. The performance of this model is slightly better than the performance of the model using point-wise mutual information. The results indicated with an asterisk or a dagger in Table 7 are statistically significant with respect to the baseline. These semantic association features effectively address the vocabulary mismatch problem by finding pairs of words hi the target page and advertisement that are correlated.

Finally, Table 8 presents the results of the system when a clustering feature is also considered. Table 8 lists the results of adding clustering to the baseline system, to the baseline with the NIST features, and to the Pearson's $\chi^2$ and PMI features. The precision at rank one results for all clustering systems were statistically significantly better than the baseline system.

TABLE 8

| Features | $\tau_b$ | P@5 | P@3 | P@1 |
|---|---|---|---|---|
| p-a$_{TDKL}$ (baseline) | 0.279 | 0.637 | 0.676 | 0.687 |
| p-aa$_{TDKL}$K-Clustering | 0.299 | 0.648 | 0.695 | 0.738 |
| p-aa$_{TDKL}$K-NIST-Clustering | 0.301 | 0.645 | 0.697 | 0.742 |
| p-aa$_{TDKL}$K-NIST-PMI$_{Web}$-Clustering | 0.317 | 0.658 | 0.703 | 0.747 |
| p-aa$_{TDKL}$K-NIST-CSQ$_{1,QLog}$-Clustering | 0.326 | 0.660 | 0.716* | 0.757 |

The system of the present invention demonstrates the advantages of calculating several different content match features and applying all of the content match features within a machine learning framework. The methods employed are language independent and do not require any external resource. The generated content match features range from simple word overlap to semantic associations using point-wise mutual information and Pearson's $\chi^2$ between pairs of terms. Cosine similarity is a robust feature both in retrieval and learning settings. The semantic association features of point-wise mutual information and Pearson's $\chi^2$ capture similarity along different dimensions than cosine similarity. Specifically, the semantic association features built on PMI and Pearson's $\chi^2$ summarize the relatedness between an advertisement and a target page beyond simple textual overlap. With these features, the semantic association features exploit relationships between terms that do not explicitly appear in both the target page and the advertisement.

The foregoing has described a number of techniques for analyzing, selecting, and displaying electronic advertisements. It is contemplated that changes and modifications may be made by one of ordinary skill in the art, to the materials and arrangements of elements of the present invention without departing from the scope of the invention.

We claim:

1. A method of ranking an electronic advertisement relative to target content on a web page, said method comprising the steps of:

extracting, using a computer, a title and keywords from said electronic advertisement and a landing page associated with said electronic advertisement for creating a first set of elements, and keywords from said target content on said web page for creating a second set of elements, said first and second sets of elements comprising a plurality of multi-word expressions;

calculating, using a computer, a first content match feature using said first and second set of elements, the content match feature to evaluate how well said electronic advertisement matches said target content on said web page;

calculating, using a computer, a second content match feature using said first and second set of elements, said second content match feature comprising a semantic association feature based on a degree of correlation between pairs of said plurality of words; and processing, using a computer, said first content match feature and said second content match feature with a machine learning model to output a relevance score of said electronic advertisement relative to said target content.

2. The method of ranking an electronic advertisement relative to target content as set forth in claim 1 wherein said first content match feature comprises a text similarity feature.

3. The method of ranking an electronic advertisement relative to target content as set forth in claim 2 wherein said text similarity feature comprises a cosine similarity feature.

4. The method of ranking an electronic advertisement relative to target content as set forth in claim 1 wherein said first content match feature comprises an exact match feature.

5. The method of ranking an electronic advertisement relative to target content as set forth in claim 4 wherein said exact match feature comprises keyword overlap.

6. The method of ranking an electronic advertisement relative to target content as set forth in claim 4 wherein said exact match feature comprises n-gram overlap.

7. The method of ranking an electronic advertisement relative to target content as set forth in claim 1 wherein said second content match feature comprises feature comprises point-wise mutual information.

8. The method of ranking an electronic advertisement relative to target content as set forth in claim 1 wherein said second content match feature comprises Pearson's $\chi 2$.

9. The method of ranking an electronic advertisement relative to target content as set forth in claim 1 wherein said machine learning model comprises a support vector machine.

10. A computer readable medium, said computer readable medium comprising a set of computer instructions implementing a system for ranking an electronic advertisement relative to target content, said set of computer instructions performing the steps of:

extracting a title and keywords from said electronic advertisement and a landing page associated with said electronic advertisement for creating a first set of elements, and keywords from said target content on said web page for creating a second set of elements, said first and second sets of elements comprising a plurality of multi-word expressions;

calculating, using a computer, a first content match feature using said first and second set of elements, the content match feature to evaluate how well said electronic advertisement matches said target content on said web page;

calculating, using a computer, a second content match feature using said first and second set of elements, said second content match feature comprising a semantic association feature based on a degree of correlation between pairs of said plurality of words; and processing said first content match feature and said second content match features with a machine learning model to output a relevance score of said electronic advertisement relative to said target content.

11. The computer readable medium as set forth in claim 10 wherein said first content match feature comprises a text similarity feature.

12. The computer readable medium as set forth in claim 11 wherein said text similarity feature comprises a cosine similarity feature.

13. The computer readable medium as set forth in claim 10 wherein said first content match feature comprises an exact match feature.

14. The computer readable medium as set forth in claim 13 wherein said exact match feature comprises keyword overlap.

15. The computer readable medium as set forth in claim 13 wherein said exact match feature comprises n-gram overlap.

16. The computer readable medium as set forth in claim 10 wherein said second content match feature comprises feature comprises point-wise mutual information.

17. The computer readable medium as set forth in claim 10 wherein said second content match feature comprises Pearson's $\chi 2$.

18. The method of ranking an electronic advertisement relative to target content as set forth in claim 10 wherein said machine learning model comprises a support vector machine.

* * * * *